C. B. ALBREE.
CAR FENDER.
APPLICATION FILED DEC. 7, 1908.
943,588.
Patented Dec. 14, 1909.
2 SHEETS—SHEET 1.
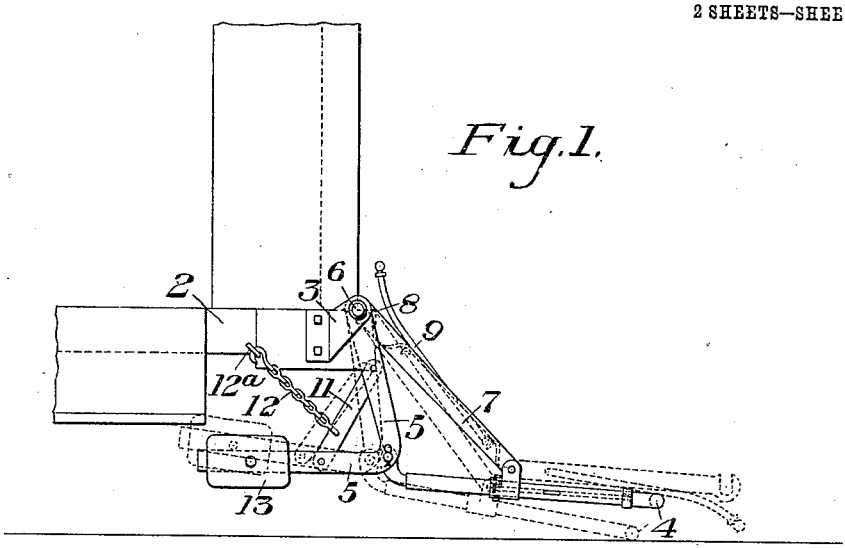
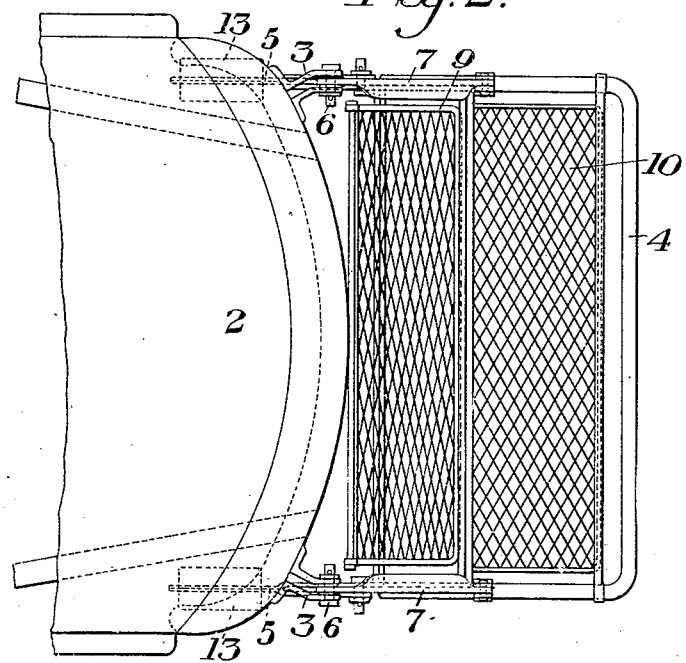
WITNESSES
INVENTOR C. B. ALBREE.
CAR FENDER.
APPLICATION FILED DEC. 7, 1908.
943,588.
Patented Dec. 14, 1909.
2 SHEETS—SHEET 2.
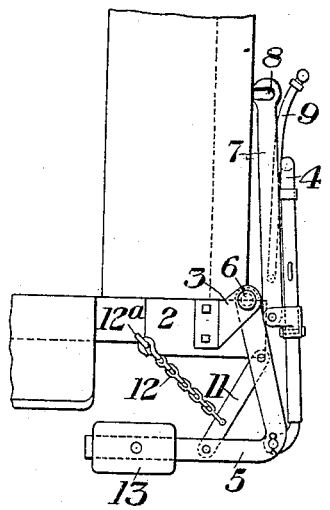
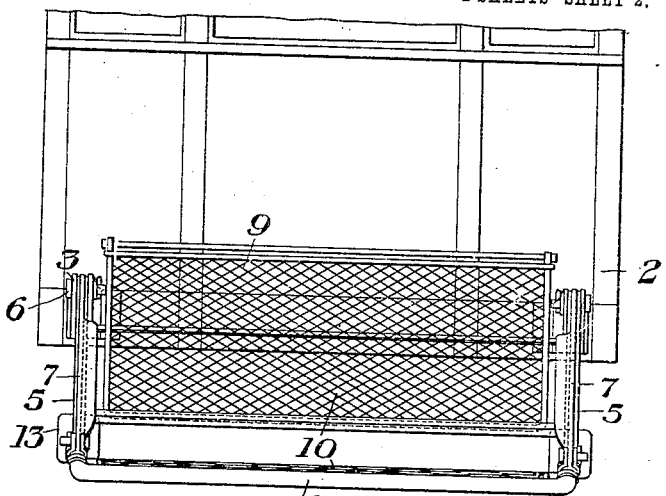
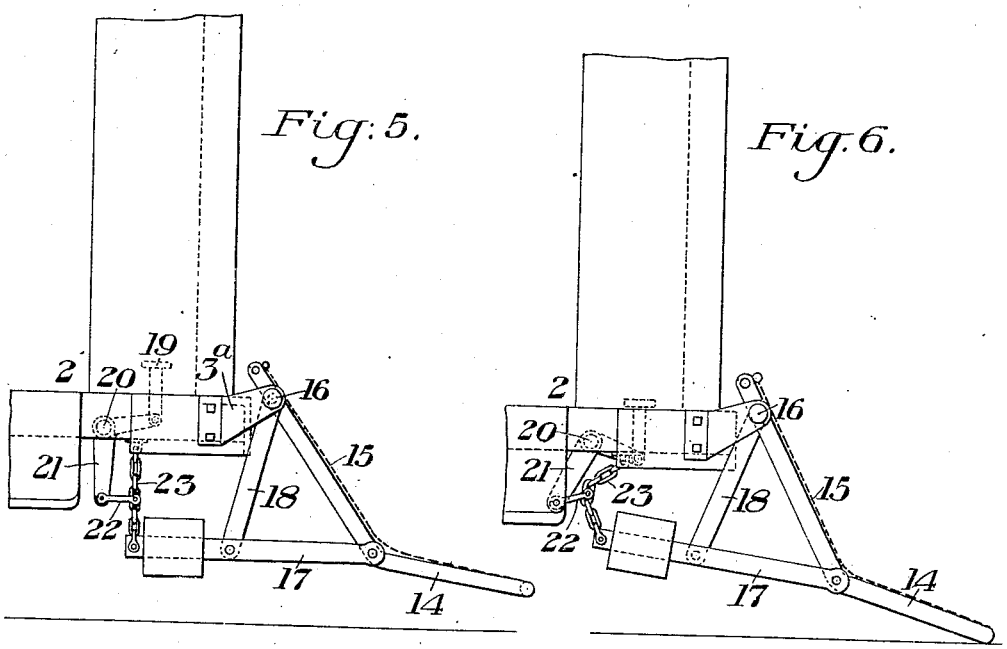
WITNESSES
R. H. Balderson
G. L. Winters
INVENTOR
C. B. Albree,
by Bakewell, Byrnes & Parmelee
his Attys.

UNITED STATES PATENT OFFICE.

CHESTER B. ALBREE, OF ALLEGHENY, PENNSYLVANIA, ASSIGNOR TO CHESTER B. ALBREE IRON WORKS COMPANY, OF PITTSBURG, PENNSYLVANIA, A CORPORATION OF PENNSYLVANIA.

CAR-FENDER.

943,588.  Specification of Letters Patent.  Patented Dec. 14, 1909.

Application filed December 7, 1908. Serial No. 466,248.

*To all whom it may concern:*

Be it known that I, CHESTER B. ALBREE, of Allegheny, Allegheny county, Pennsylvania, have invented a new and useful Improvement in Car-Fenders, of which the following is a full, clear, and exact description, reference being had to the accompanying drawings, forming part of this specification, in which—

Figure 1 is a side view showing one form of my invention applied to a railway car; Fig. 2 is a plan view of the same; Fig. 3 is a side view showing the fender in its folded position; Fig. 4 is an end view and Figs. 5 and 6 are side views showing a modified form of the invention in two different positions.

My invention has relation to the class of car fenders and is designed to provide a fender which will operate to pick up any person or object struck by the fender no matter what may be the position of the object, viz: either standing or horizontal on the track. Heretofore fenders have been proposed and used which would satisfactorily pick up the object struck, provided said object was in a standing position; but if the object was in a horizontal position upon the track, said fenders could not be depended upon to pick up such object, as in many cases they would simply pass over it. The present invention is particularly designed to provide a fender in which it is impossible for the fender to ride over the object struck, but in which the impact of the fender against the object will automatically lower the fender into a position in which it must necessarily pick up the object.

The nature of my invention will be best understood by reference to the accompanying drawings in which I have shown two preferred embodiments thereof and it will now be described, it being premised, however, that various changes may be made in the details of construction and arrangement of the parts, without departing from the spirit and scope of the invention, as defined in the appended claims.

Referring first to the form shown in Figs. 1 to 4 inclusive, the numeral 2 designates the front platform of the car which is provided at each side with a bracket or attachment iron 3 of any suitable character or construction. 4 designates the fender frame comprising front and side bars, the latter being slightly upturned at their rear ends and pivotally connected to angle levers 5 whose upper ends are pivoted at 6 in the brackets or attachment irons 3. 7 designates braces which are pivotally connected at their upper ends to the brackets or attachment angle irons 3 and at their lower ends are pivotally connected to the intermediate portions of the side bars of the frame of the fender 4. The connections between the upper end of the braces 7 and the pivot pins 6 are preferably made by open hooks 8 at the upper end of the braces which hook over the ends of the pivots 6. 9 designates any suitable apron constituting the upper inclined portion of the fender basket. The forward bar of the fender 4 may be provided with any suitable buffer and the body of the fender may be constructed of any suitable filling, such as the wire netting 10. The arms of the angle levers 5 are connected by the links 11 to which are preferably attached chains 12 or other flexible connections whose opposite ends are connected to the car platform as indicated at $12^a$. The rearwardly projecting arms of the angle levers 5 are provided with counterweights 13 adjustably mounted thereon. These counterweights are sufficiently heavy to normally counterbalance the weight of the fender and hold it in substantially the position indicated by full lines in Fig. 1. The chains or other flexible connections 12 prevent the fender from swinging forwardly and upwardly while at the same time they permit it to swing backwardly and downwardly. When the front bar of the fender 4 strikes an object, the impact of the blow will cause the entire fender to swing backwardly and downwardly, about the centers of the pins or pivots 6 so that the forward end of the fender will come in contact with the track as shown in the lower dotted lines in Fig. 1. In this position the fender will necessarily pick up the object struck, it being manifestly impossible for it to ride over such object. When not in use, the fender may be folded up against the front end of the car in the manner shown in Fig. 3. This is accomplished by disconnecting the hooks 8 from the pin 6 and turning the braces 7, together with the apron 9 forwardly and downwardly upon the main portion of the fender as indicated in the upper dotted lines in Fig. 1. The fender 4 can then be turned upwardly into the position shown in Fig. 3. It will be seen that the counterweight acts upon the fender in this folded position to tend to retain it in such position.

The fender shown in Figs. 5 and 6 is of the same general character as that shown in the preceding figures, but is not adapted to be folded upwardly against the front end of the car. In this form of the invention, the frame 14 of the fender is extended rearwardly and upwardly to form the side frame of the apron 15, the upper portions of these extensions being pivoted at 16 to the attachment irons or brackets 3ª. Counterweighted arms 17 are connected to the side bars of the fender 14 at the points where they are bent upwardly and these arms are connected with the pivot 16 by the links 18. It will be seen that the action of this fender is precisely the same as that shown in Figs. 1 to 4. That is to say, when the fender strikes an object, the impact causes it to move rearwardly and downwardly into contact with the track as shown in Fig. 6. If desired, means may also be provided to be operated by the motorman for positively moving the fender into the position shown in Fig. 6. Said means may consist of a foot lever 19 attached to a transverse shaft 20 having depending arms 21 connected by the links 22 with the chains 23 which connect the rear end of the arm 17 with the car platform. The motorman by pressing his foot on the button of the lever 19 rocks the shaft 20 and thereby depresses the fender to the position shown in Fig. 6. This attachment may also be provided for the form of fender shown in Figs. 1 to 4, if desired, but is ordinarily not necessary, as the impact of the fender against the object struck is sufficient for the purpose.

The fender above described has been subjected to severe and competitive tests which have demonstrated its great efficiency in picking up the object struck under varying conditions of speed and in different positions of the object.

It will be obvious that various changes can be made in the details of construction and arrangement. Thus the frame members of the fender can be variously shaped and arranged, the manner of attachment to the car may be changed, and the counterweight may be arranged in other ways so as to effectively balance the fender and support it in its normal position.

I claim:—

1. A car fender pivotally attached to a car, depending rigid side braces, pivotally connected to the sides of the fender basket, a counterweight connected to the fender arranged to hold it in normal position, said fender and counterweight being free to swing rearwardly and downwardly, and means for preventing the fender from swinging upwardly and forwardly from its normal position, the entire device being arranged to swing about a single pivotal axis; substantially as described.

2. A car fender pivotally attached to a car, depending rigid side braces, pivotally connected to the sides of the fender basket, said braces being arranged to allow folding up of the basket, a counterweight connected to the fender and arranged to hold it in normal position; said fender and counterweight being free to swing rearwardly and downwardly, and means for preventing the fender from swinging forwardly and upwardly from its normal position, the entire device being arranged to swing about a single pivoted axis; substantially as described.

3. A car fender pivotally attached to a car, depending rigid side braces, pivotally connected to the sides of the fender basket, said braces being arranged to allow folding up of the basket, a counterweight connected to the fender and arranged to hold it in normal position, said fender and counterweight being free to swing rearwardly and downwardly, and means for preventing the fender from swinging forwardly and upwardly from its normal position, the entire device being arranged to swing about a single pivoted axis, said counterweight being also arranged to act to retain the fender in its folded-up position; substantially as described.

4. A car fender having fixed pivotal nonsliding connection to a car, an upwardly extending apron separably attached to the fender, and a counterweight device for normally holding the fender and apron in a normal position, said fender and apron being free to swing rearwardly and downwardly on its pivots when striking an object; substantially as described.

5. A car fender having fixed pivotal nonsliding connection to a car, an upwardly extending apron separably attached to the fender, and a counterweight device for normally holding the fender and apron in a normal position, said fender and apron being free to swing rearwardly and downwardly on its pivots when striking an object, and having positive means for preventing oscillation of the fender and apron upwardly and forwardly from such normal position; substantially as described.

6. A car fender pivotally attached to a car, depending rigid side braces, pivotally connected to the sides of the fender basket, a counterweight connected to the fender arranged to hold it in normal position, said fender and counterweight being free to swing rearwardly and downwardly, means for preventing the fender from swinging upwardly and forwardly from its normal position, the entire device being arranged to swing about a single pivotal axis, and a device connected to the counterweight and arranged to be operated at will whereby the fender may be downwardly and backwardly rotated independently of striking an object; substantialy as described.

In testimony whereof, I have hereunto set my hand.

CHESTER B. ALBREE.

Witnesses:
M. V. KIEHL,
H. M. CORWIN.